US006489566B1

(12) United States Patent
Durin

(10) Patent No.: US 6,489,566 B1
(45) Date of Patent: Dec. 3, 2002

(54) DEVICE FOR FIXING A WIRE ON A CARRIER ELEMENT PROVIDED WITH AT LEAST AN OPENING AND CARRIER ASSEMBLY FOR CABLE TROUGHS COMPRISING AT LEAST SAID DEVICE

(75) Inventor: Michel Durin, Fontenay-le-Fleury (FR)

(73) Assignee: Metal Deploye S.A., Montbard (FR)

( * ) Notice: Subject to any disclaimer, the term of this patent is extended or adjusted under 35 U.S.C. 154(b) by 0 days.

(21) Appl. No.: 09/830,713

(22) PCT Filed: Oct. 6, 1999

(86) PCT No.: PCT/FR99/02387

§ 371 (c)(1),
(2), (4) Date: May 1, 2001

(87) PCT Pub. No.: WO00/27005

PCT Pub. Date: May 11, 2000

(30) Foreign Application Priority Data

Nov. 3, 1998 (FR) .............................................. 98 13790

(51) Int. Cl.[7] .................................................. H01B 7/00
(52) U.S. Cl. ............. 174/135; 248/220.22; 248/220.31; 248/225.21; 24/563; 52/712
(58) Field of Search ................... 174/48, 99 R, 174/135; 24/563; 52/677, 696, 712; 211/183, 192; 248/220.22, 220.31, 221.11, 225.21

(56) References Cited

U.S. PATENT DOCUMENTS

| | | | | |
|---|---|---|---|---|
| 3,461,220 A | * | 8/1969 | Hukin .......................... 174/48 |
| 4,119,285 A | * | 10/1978 | Bisping et al. ......... 248/222.12 |
| 4,534,147 A | * | 8/1985 | Cristell ........................ 174/48 |
| 4,865,279 A | * | 9/1989 | Kosugi ......................... 24/563 |
| 5,184,792 A | * | 2/1993 | Bernhard et al. .............. 248/71 |
| 5,388,791 A | * | 2/1995 | McCrory et al. .............. 24/543 |
| 5,608,603 A | * | 3/1997 | Su ............................... 200/303 |
| 5,639,049 A | * | 6/1997 | Jennings et al. .............. 24/563 |
| 6,257,898 B1 | * | 7/2001 | Serizawa et al. ........... 174/135 |
| 6,262,373 B1 | * | 7/2001 | Dagley et al. .............. 174/135 |

FOREIGN PATENT DOCUMENTS

| | | |
|---|---|---|
| FR | 2 540 946 | 8/1984 |
| FR | 2 697 690 | 5/1994 |

* cited by examiner

Primary Examiner—Dean A. Reichard
Assistant Examiner—Adolfo Nino
(74) Attorney, Agent, or Firm—Young & Thompson

(57) ABSTRACT

A device for fixing a wire to a support member in which there is at least one opening and a support member for a cable duct including the fixing device.

24 Claims, 3 Drawing Sheets

DEVICE FOR FIXING A WIRE ON A CARRIER ELEMENT PROVIDED WITH AT LEAST AN OPENING AND CARRIER ASSEMBLY FOR CABLE TROUGHS COMPRISING AT LEAST SAID DEVICE

The present invention relates to a fixing device for fixing a wire to a support member in which there is at least one opening.

The problem of fixing a wire to a support member often arises; for example, it arises when fixing a mesh structure made of wires welded together; one example of a mesh structure is a generally U-shaped cable duct which is made of longitudinal wires welded to transverse wires bent into a U shape; a cable duct is adapted to receive electrical, telephone or data cables, optical fibers, etc. This is known in the art.

The use of a fixing section having a plane surface adapted to receive the bottom of the cable duct and provided with lugs adapted to cooperate with the wires of the bottom of the cable duct to fix this kind of mesh structure has already been proposed, for example in the document FR-A-2 697 690.

According to that document, a sheetmetal fixing section has a plane surface on which rest longitudinal bottom wires of a cable duct of the kind shown in perspective in FIG. 4, which are welded to U-shaped transverse wires.

The plane surface of the section has at least two elongate openings in it in which lugs are formed by cutting and bending.

Before the fixing operation is performed, the lugs are conformed into a tongue that extends parallel to the plane surface of the section at a distance from that plane surface globally equal to the diameter of the longitudinal bottom wires.

To fix the cable duct, it is placed on the plane surface of the section and moved in translation so that the bottom wires engage under the tongues of the lugs up to the point at which they abut against the connection of each tongue to the plane surface of the section; the bottom wires repeat at predetermined intervals and the position of the lugs must of course correspond to those intervals.

To complete the fixing operation all that remains is to bend the tongues of the lugs toward the plane surface of the section and around the longitudinal bottom wires using any suitable tool, or preferably using a special tool such as the tool 100 shown in FIG. 6, which is marketed by the applicant.

The above arrangement is satisfactory for fixing a mesh structure, but has a number of drawbacks.

Firstly, the section with lugs matches only one particular type of wire mesh cable duct, with which it is designed to cooperate, the distance between the lugs having to correspond exactly to the distance between the longitudinal wires of the cable duct.

Secondly, the fixing sections must be perfectly aligned with each other if a sinuous route of the cable duct is to be avoided. Such alignment presupposes a similar alignment of the structures supporting the fixing sections, such as walls or posts, which cannot always be perfectly obtained.

A section with lugs is not suitable for fixing a structure which is not of the mesh kind, but of the globally solid kind; for example, U-shaped cross-section perforated sheetmetal cable ducts are known in the cable duct art; for these a section with no lugs is provided, having in a plane surface perforations with which openings in the bottom of the cable duct are aligned so that the cable duct can be fixed by means of nuts and bolts. The L-shaped section 11 shown in FIG. 1 is one example of a perforated section of this kind; it has a horizontal part 18 carrying a plane flange 12 and a vertical part 19 which is attached to a support member such as a wall 10; the plane top flange 12 incorporates perforations 13 which are preferably elongate to ensure that the perforations in the globally solid structure line up with them.

Thus two types of section are needed to fix a mesh structure and a globally solid structure.

An object of the present invention is to alleviate this drawback. It relates to a device for fixing a wire to a support member in which there is at least one opening, without lugs, so that a single type of support member can be used to fix at least one wire, such as longitudinal wires of a mesh structure, or a globally solid structure.

Another aim is for the wire fixing device to be suitable for more than one type of mesh structure with slightly different spacings of the longitudinal wires, of the order of a few millimeters at most.

Another aim is for the fixing device to accommodate imperfect alignment of the support members.

Another aim is for the fixing device to operate regardless of the position of the support member.

According to the invention, a fixing device which can be used to fix a wire to a support member having a plane flange in which there is at least one perforation is characterized in that it is made of sheetmetal and includes a globally plane baseplate from which emerges a lug adapted to be passed through said perforation and to engage over the wire.

The dimensions of the baseplate are such that it cannot pass through the opening or openings in the plane flange of the support member.

The lug advantageously includes a tongue parallel to the baseplate to which it is joined by a heelpiece and the tongue is at a distance from the baseplate globally equal to the diameter of the wire to be fixed plus the thickness of the plane flange of the support member.

The lug is preferably formed by the material originally occupying the cut-out in the baseplate; the cut-out is advantageously generally rectangular.

The tongue is preferably just above the cut-out that it overlies.

The edge of the cut-out facing the heelpiece of the lug and the edge of the baseplate near the heelpiece are preferably formed into inclined claws on the same side as the lug.

Alternatively, two facing edges of the cut-out carry inclined claws on the same side as the lug.

The baseplate preferably has two rims on the opposite side of the baseplate to the lug.

In a different embodiment of the invention the baseplate has two rims on the same side of the baseplate as the lug; said rims are preferably provided with claws.

In one particular application of the fixing device according to the invention the device is designed for fixing a mesh structure in the form of a cable duct.

The present invention also relates to a support system for a wire mesh cable duct consisting of the combination of at least one fixing device according to the invention and a support member in which there is at least one elongate perforation in a plane flange.

The support member is, for example, a section in the form of an angle-iron, an angle-bracket, a hanger, a swing-arm, etc. for fixing the cable duct to a vertical wall, to posts, or to a ceiling, using the bottom wires of the cable duct or the side wires.

The support member preferably has at least two perforations in it, there are preferably at least two associated fixing devices, and the perforations are preferably disposed on the flange of the support member to cooperate with different longitudinal wires of the cable duct.

In order to explain the subject matter of the invention, embodiments of the invention shown in the accompanying drawings by way of purely illustrative and non-limiting example will now be described.

Figure 1:
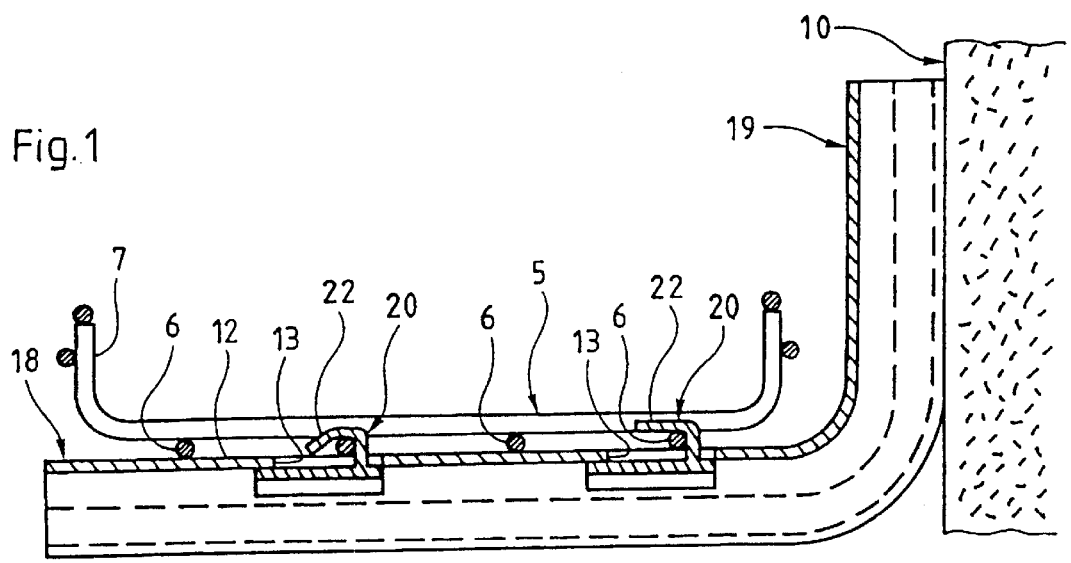
FIG. 1 is a partial view in section taken along the line 1—1 in FIG. 4 and showing the use of a prior art perforated section to fix a mesh cable duct using a fixing device according to the invention.

FIG. 1 shows a support member in the form of a section 11 with perforations 13, usually used to support in a fixed manner a globally solid structure, and here equipped with fixing devices 20 according to the invention enabling the same section 11 to carry in a fixed manner wires 6 such as longitudinal wires of a mesh structure, here a cable duct 5.

Figure 2:
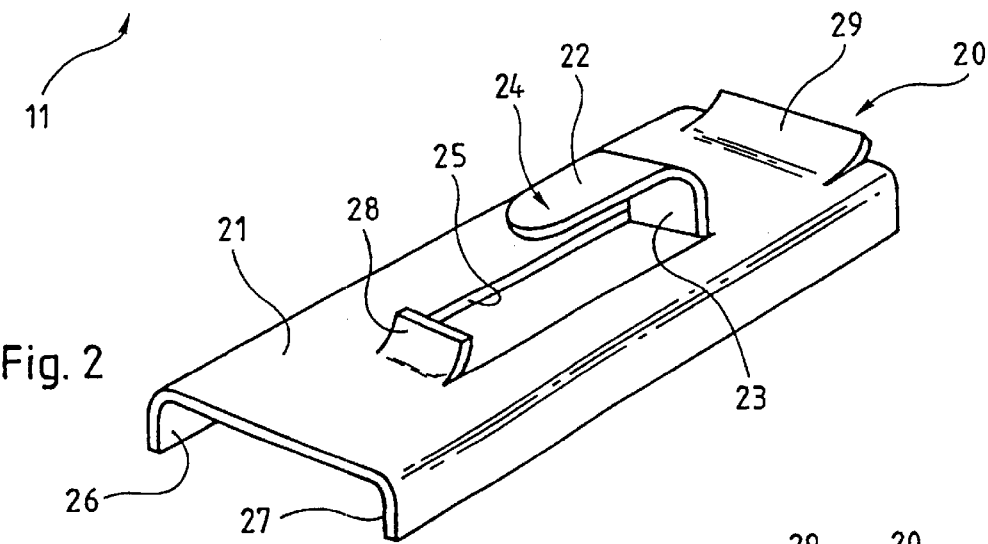
FIG. 2 is a perspective view to a larger scale of a fixing device according to the invention.

FIG. 2 shows a fixing device 20 according to the invention in perspective and to a larger scale. FIG. 2 shows that the fixing device 20 has a generally rectangular baseplate 21 whose length and width are greater than the length and width of the perforations 13 in the section 11, from which emerges a lug 24; the fixing device 20 is made of sheetmetal and in this example the lug 24 is formed by the material originally occupying a generally rectangular cut-out 25 in the baseplate 21, preferably extending along its median longitudinal axis. The lug 24 includes a tongue 22 which is advantageously parallel to the baseplate 21, to which it is joined by a heelpiece 23 globally perpendicular to it; the height of the heelpiece 23 is of the same order of magnitude as the diameter of the wire 6 to be fixed plus the thickness of the plane flange 12 of the fixing section 11.

The tongue 22 lies just above the cut-out 25 that it overlies.

To make the fixing device 20 sufficiently rigid when it is made from thin sheetmetal, the baseplate 21 has two rims 26, 27 along its longitudinal edges on the side opposite that incorporating the lug 24; the rims 26, 27 are advantageously perpendicular to the baseplate 21.

The transverse edge of the cut-out 25 which faces the heelpiece 23 of the lug 24 is cut and bent to form a claw 28 inclined to the baseplate 21 on the same side as the lug 24.

The transverse edge of the baseplate 21 near the heelpiece 23 is also cut and bent to form an inclined claw 29 on the same side as the claw 28; the claws 28 and 29 are therefore on respective opposite sides of the heelpiece 23 of the lug 24 and bracket the tongue 22 longitudinally, so to speak.

The use of the fixing device 20 according to the invention follows from the preceding description.

FIG. 1 shows the fixing device 20 offered up with the top face of the baseplate 21 cooperating with the bottom face of the plane flange 12 of the section 11. The tongue 22 and its heelpiece have passed through the elongate perforation 13 in the section 11.

In this example the fixing device 20 does not include any claws 28 or 29 and the baseplate 21 is directly in contact with the section 11.

Figure 6:
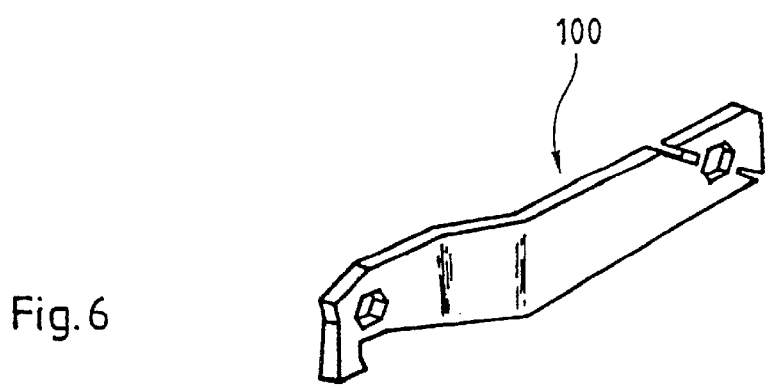
FIG. 6 is a perspective view of a tool that can be used with the fixing device shown in FIGS. 1 to 4.

The fixing device 20 in the right-hand part of FIG. 1 is shown just before the fixing operation as such; the device shown in the left-hand part of FIG. 1 is already operational, as the tongue 22 has been bent around the longitudinal wire 6 and toward the surface of the section 11 using a screwdriver or preferably the tool 100 shown in FIG. 6.

Figure 4:
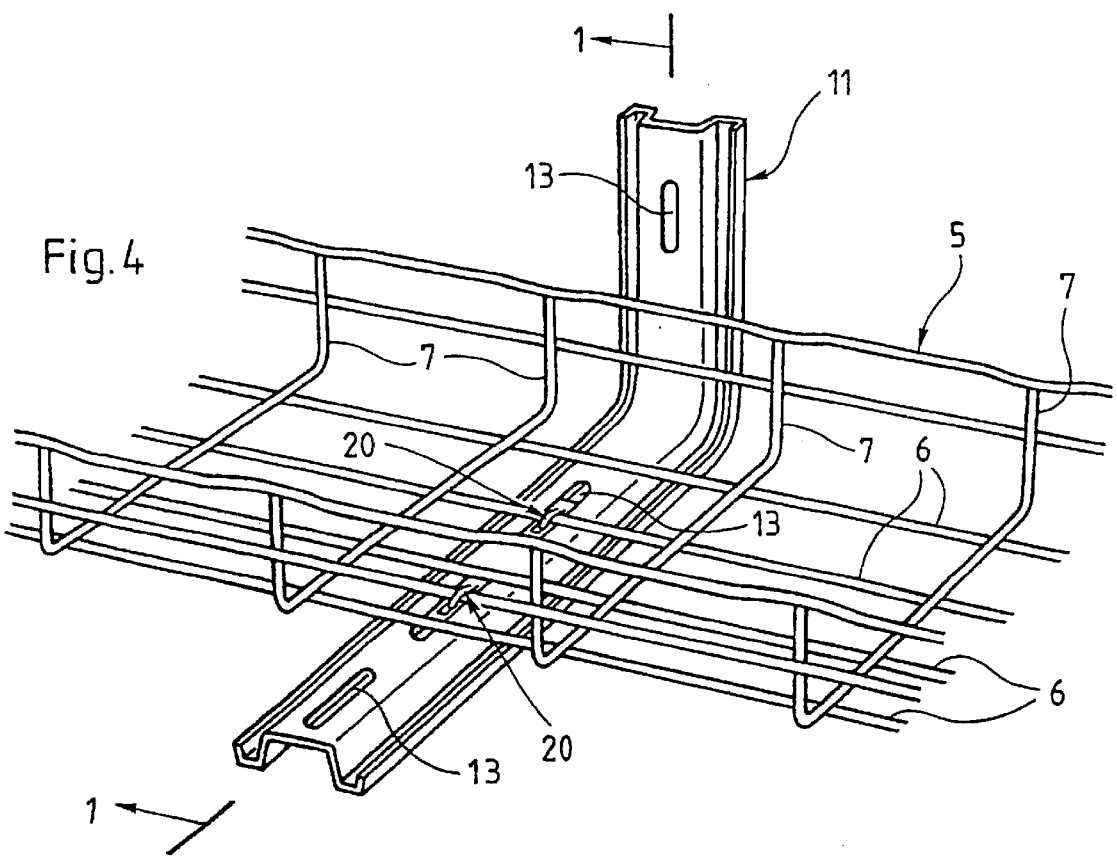
FIG. 4 is a perspective view of the assembly shown in FIG. 1.

FIG. 4 is a perspective view of the cable duct 5 fixed in this way to the section 11.

Figure 5:
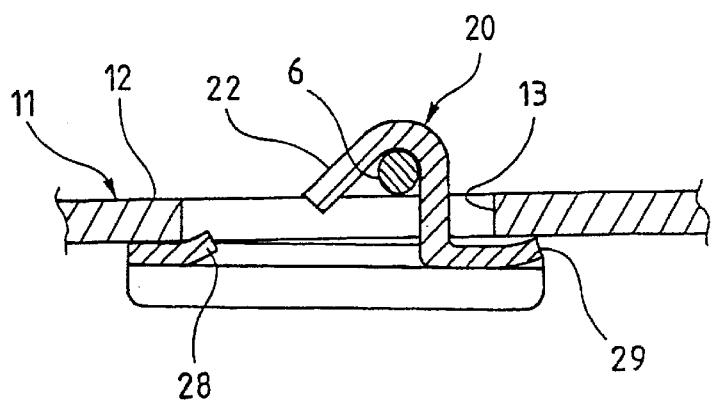
FIG. 5 is a detail view showing the use of the device shown in FIG. 2.

FIG. 5 shows the fixing device 20 with claws 28 and 29 shown in FIG. 2 in its operational position: by cooperating with the bottom face of the plane flange 12 of the section 11, the claws 28, 29 improve immobilization of the fixing device 20 relative to the section 11 in its longitudinal direction; the claw 28 can advantageously locate against the edge of the perforation 13, inside the perforation.

In a different embodiment, not shown, the claw 28 is inside an additional opening in the plane flange 12 of the section 11, instead of the perforation 13.

Figure 3:
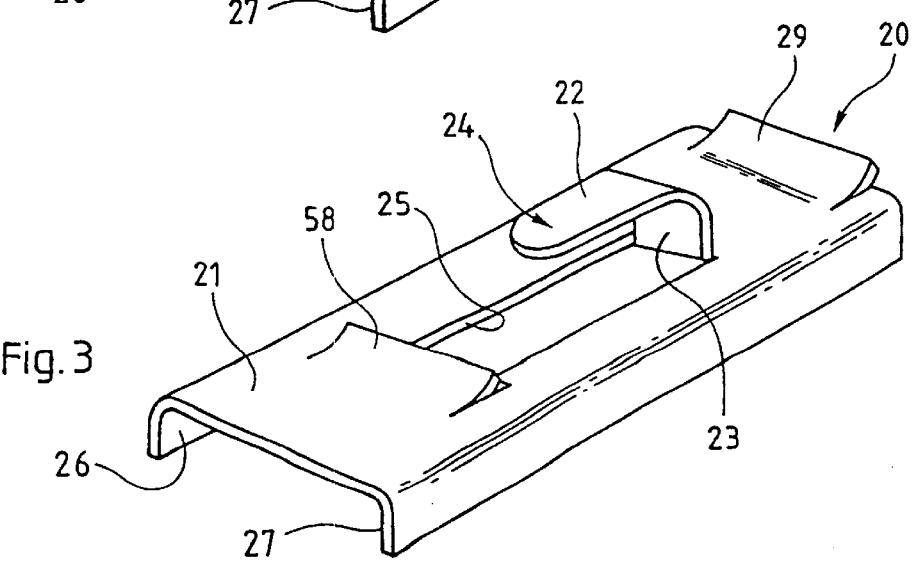
FIG. 3 is a view analogous to FIG. 2 of a different embodiment.

In the embodiment shown in FIG. 3 the claw 28 is replaced by a larger claw 58 which is designed to cooperate with the bottom face of the plane flange 12 of the section 11, like the claw 29.

Figure 7:
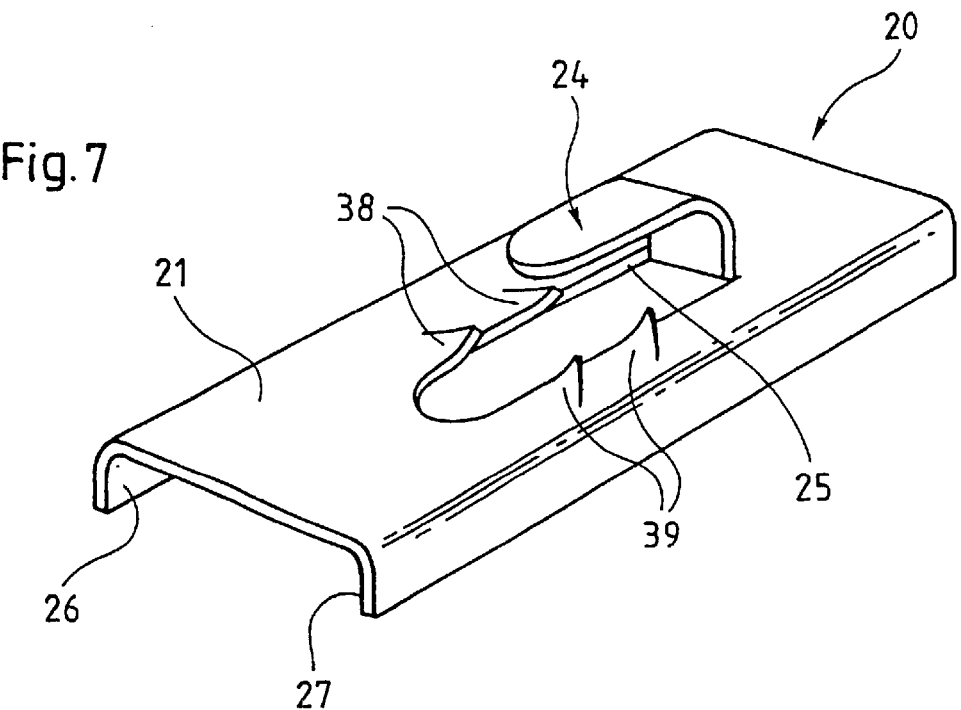
FIG. 7 is similar to FIG. 2 and shows a different embodiment of the fixing device according to the invention.

In the embodiment shown in FIG. 7 the fixing device 20 also carries claws 38, 39 but in this case they are formed by cutting and bending the longitudinal edges of the cut-out 25.

Figure 8:
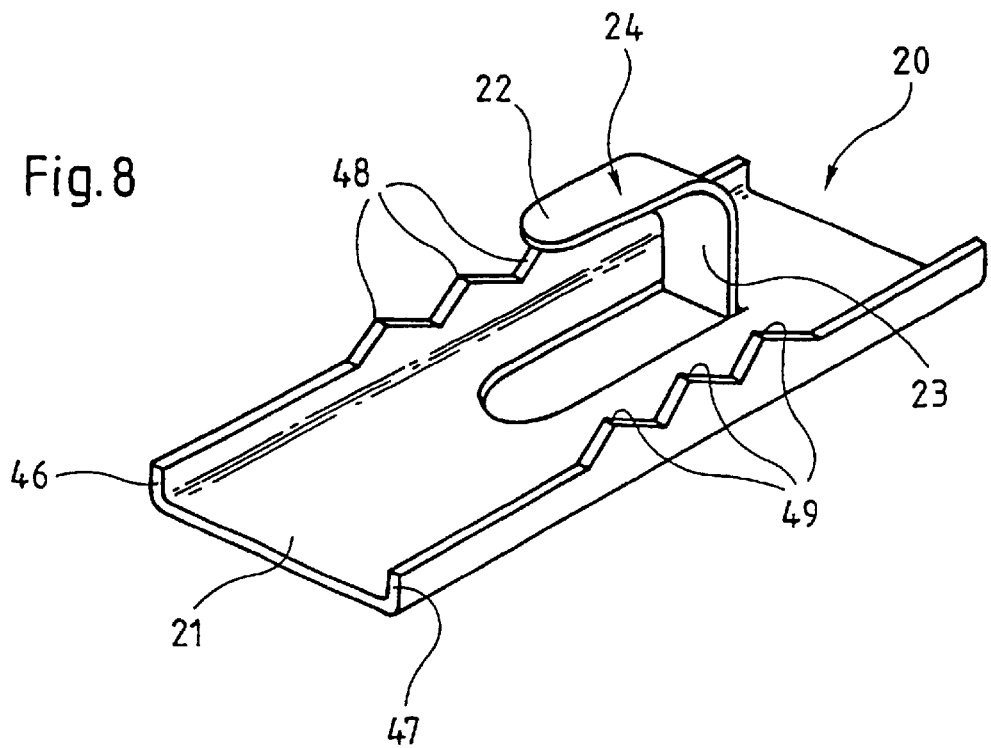
FIG. 8 is similar to FIG. 2 and shows a further embodiment of the fixing device according to the invention.

FIG. 8 shows an embodiment of the fixing device 20 in which the stiffener rims 46, 47 are on the same side of the baseplate 21 as the lug 24; this arrangement enables claws 48, 49 in the form of teeth to be formed simply by cutting out said rims 46, 47; the claws 48, 49 are advantageously formed in line with the lug 24; of course, in this case the height of the heelpiece 23 allows not only for the diameter of the wire 6 to be fixed plus the thickness of the plane flange 12 of the section 11, but also the height of the claws 48, 49 relative to the baseplate 21.

Note that because of the elongate shape of the perforations 13 in the fixing section 12, the fixing device 20 according to the invention is able to accommodate fabrication tolerances because it can be moved longitudinally relative to the section before the fixing operation proper, i.e. before bending its tongue 22.

This also enables the same perforated fixing sections 11 to be used with cable ducts 5 in which the spacing of the longitudinal wires 6 is not exactly the same, the permitted variation in the spacing being determined by the length of the elongate perforations 13 in the sections and being of the order of a few millimeters.

Similarly, by moving the fixing device 20 longitudinally relative to the section 11, it is possible to compensate poor alignment of the support 10 in line with the sections 11 and preserve the alignment of the cable duct.

What is claimed is:

1. A fixing device which can be used to fix a wire (6) to a support member (11) having a plane flange (12) wherein there is at least one perforation (13), characterized in that it is made of sheet metal and includes a globally plane base plate (21) from which emerges a single lug (24) having dimensions defined for the lug to be passed through said perforation (13) and to engage over the wire (6).

2. A fixing device according to claim 1, characterized in that the lug (24) includes a tongue (22) parallel to the base plate (21) to which it is joined by a heelpiece (23) and the tongue (22) is at a distance from the base plate (21) globally equal to the diameter of the wire (6) to be fixed plus the thickness of the plane flange (12) of the support member (11).

3. A fixing device according to claim 2, characterized in that the lug (24) is formed by the material originally occupying a cut-out (25) in the base plate (21).

4. A fixing device according to claim 3, characterized in that the cut-out (25) is generally rectangular.

5. A fixing device according to claim 3, characterized in that the tongue (22) is just above the cut-out (25) that it overlies.

6. A fixing device according to claim 3, characterized in that the edge of the cut-out (25) facing the heelpiece (23) of the lug (24) and the edge of the base plate (21) near the heelpiece (23) are formed into inclined claws (28, 29, 58) on the same side as the lug (24).

7. A fixing device according to claim 3, characterized in that two facing edges of the cut-out (25) carry inclined claws (38, 39) on the same side as the lug (24).

8. A fixing device according to claim 1, characterized in that the base plate (21) has two rims (26, 27) on the opposite side of the base plate (21) to the lug (24).

9. A fixing device according to claim 1, characterized in that the base plate (21) has two rims (46, 47) on the same side of the base plate (21) as the lug (24).

10. A fixing device according to claim 9, characterized in that said rims (46, 47) are provided with claws (48, 49).

11. A fixing device according to claim 1, characterized in that it is designed for fixing a mesh structure in the form of a cable duct (5).

12. A support and fixation system for a wire mesh cable duct (5) consisting of the combination of at least one fixing device (20) according to claim 11 and a support member (11) in which there is at least one elongate perforation (13) in a plane flange, the at least one fixing device being pressed against the plane flange while said lug is passed through the at least one elongate perforation so that the wire engaged in said lug is pinched between said lug and the plane flange.

13. A support system according to claim 12, characterized in that the support member (11) has at least two perforations (13) in it, there are at least two associated fixing devices (20), and the perforations (13) are disposed on the flange (12) of the support member (13) to cooperate with different longitudinal wires (6) of the cable duct (5).

14. A fixing device according to claim 1, characterized in that the lug (24) is formed by the material originally occupying a cut-out (25) in the base plate (21).

15. fixing device according to claim 14, characterized in that the cut-out (25) is generally rectangular.

16. A fixing device which can be used to fix a wire (6) to a support member (11) having a plane flange (12) in which there is at least one perforation (13), said fixing device being made of sheet metal and comprising a globally plane base plate (21) from which emerges a lug (24) adapted to be passed through said perforation (13) and to engage over the wire (6), said lug (24) comprising a tongue (22) parallel to the base plate (21) to which it is joined by a heelpiece (23), and being formed by the material originally occupying a cut-out (25) in the base plate (21), the edge of the cut-out (25) facing the heelpiece (23) of the lug (24) and the edge of the base plate (21) near the heelpiece (23) being formed into inclined claws (28, 29, 58) on the same side as the lug (24).

17. The device of claim 16, wherein the tongue (22) is at a distance from the base plate (21) globally equal to the diameter of the wire (6) to be fixed plus the thickness of the plane flange (12) of the support member (11).

18. A fixing device according to claim 16, characterized in that the cut-out (25) is generally rectangular.

19. A fixing device according to claim 16, characterized in that the tongue (22) is just above the cut-out (25) that it overlies.

20. A fixing device which can be used to fix a wire (6) to a support member (11) having a plane flange (12) in which there is at least one perforation (13), said fixing device being made of sheet metal and comprising a globally plane base plate (21) from which emerges a lug (24) adapted to be passed through said perforation (13) and to engage over the wire (6), said lug (24) comprising a tongue (22) parallel to the base plate (21) to which it is joined by a heelpiece, and being formed by the material originally occupying a cut-out (25) in the base plate (21), wherein two facing edges of the cut-out (25) carry inclined claws (38, 39) on the same side as the lug (24).

21. A fixing device which can be used to fix a wire (6) to a support member (11) having a plane flange (12) in which there is at least one perforation (13), said fixing device being made of sheet metal and comprising a globally plane base plate (21) from which emerges a lug (24) adapted to be passed through said perforation (13) and to engage over the wire (6), said lug (24) comprising a tongue (22) parallel to the base plate (21) to which it is joined by a heelpiece (23), and being formed by the material originally occupying a cut-out (25) in the base plate (21), wherein said base plate (21) has two rims (26, 27) on the opposite side of the base plate (21) to the lug (24).

22. A fixing device according to claim 21, characterized in that it is designed for fixing a mesh structure in the form of a cable duct (5).

23. A support system for a wire mesh cable duct (5) consisting of the combination of at least one fixing device (20) according to claim 22 and a support member (11) in which there is at least one elongate perforation (13) in a plane flange.

24. A support system according to claim 23, characterized in that the support member (11) has at least two perforations (13) in it, there are at least two associated fixing devices (20), and the perforations (13) are disposed on the flange (12) of the support member (13) to cooperate with different longitudinal wires (6) of the cable duct (5).

* * * * *